US007108462B2

(12) United States Patent
Newman

(10) Patent No.: US 7,108,462 B2
(45) Date of Patent: Sep. 19, 2006

(54) WORKPIECE CLAMPING DEVICE FOR AUTOMATED MACHINING PROCESSES

(76) Inventor: Greg Newman, 1753 E. Flintlock Way, Chandler, AZ (US) 85249

(*) Notice: Subject to any disclaimer, the term of this patent is extended or adjusted under 35 U.S.C. 154(b) by 0 days.

(21) Appl. No.: 11/239,848

(22) Filed: Sep. 30, 2005

(65) Prior Publication Data

US 2006/0029478 A1 Feb. 9, 2006

Related U.S. Application Data

(63) Continuation of application No. 10/859,880, filed on Jun. 2, 2004, now Pat. No. 6,976,814.

(60) Provisional application No. 60/510,538, filed on Oct. 9, 2003.

(51) Int. Cl.
*B23C 1/00* (2006.01)

(52) U.S. Cl. ...................... 409/132; 409/164; 409/225; 409/219; 269/305; 269/329; 269/257

(58) Field of Classification Search ........ 409/163–164, 409/205, 219–221, 225, 131–132; 269/305, 269/303, 329, 257
See application file for complete search history.

(56) References Cited

U.S. PATENT DOCUMENTS

| | | | |
|---|---|---|---|
| 1,059,545 | A | 4/1913 | Kunze |
| 1,539,744 | A | 5/1925 | Kelly |
| 1,803,196 | A | 4/1931 | Mader |
| 1,938,375 | A | 12/1933 | Coffee |
| 2,801,555 | A | 8/1957 | Freeland Everlett et al. |
| 3,585,743 | A | 6/1971 | Jeffers |
| 4,091,766 | A | 5/1978 | Colliard |
| 4,137,660 | A | 2/1979 | Dettmann et al. |
| 4,767,110 | A | 8/1988 | Yang |
| 4,794,687 | A | 1/1989 | Peters et al. |
| 5,036,610 | A | 8/1991 | Fehr |
| 5,064,321 | A | 11/1991 | Barnes |
| 5,092,067 | A | 3/1992 | Prout |
| 5,116,174 | A | 5/1992 | Fried et al. |
| 5,139,246 | A | 8/1992 | Yakou |
| 5,220,718 | A | 6/1993 | Speller et al. |
| D362,689 | S | 9/1995 | Goldman et al. |
| 5,515,033 | A | 5/1996 | Matarazzo |
| 5,569,003 | A | 10/1996 | Goldman et al. |
| 5,700,117 | A | 12/1997 | Sella |
| 5,718,422 | A | 2/1998 | Morghen |
| 5,732,937 | A | 3/1998 | Morghen |
| 5,897,275 | A | 4/1999 | Sella |
| 5,915,678 | A | 6/1999 | Slocum et al. |
| 6,092,321 | A | 7/2000 | Cheng |
| 6,186,711 | B1 | 2/2001 | Mueller |
| 6,286,823 | B1 | 9/2001 | Morghen |
| 6,329,918 | B1 | 12/2001 | Moyer |
| 6,478,515 | B1 | 11/2002 | Mueller |

(Continued)

*Primary Examiner*—Erica Cadugan
(74) *Attorney, Agent, or Firm*—Schmeiser, Olsen & Watts LLP

(57) ABSTRACT

A workpiece engraving machine provides for a way to clamp, align and identify a workpiece for engraving. An engravable band with a permanently embedded flexible engravable tag and a method of engraving the tag in the engraving machine. In a first aspect, a workpiece clamping table comprising a support surface, a clamp, one or more workpiece alignment devices, a positional sensor and a processor. The processor determines the workpiece type, keeps the automatic inventory and may indicate when workpieces need to be ordered. In a second aspect, a workpiece engraving machine may also have workpiece inventory doors which comprise containers with workpiece holders. The containers are attached to the engraving machine by rotators.

15 Claims, 10 Drawing Sheets

U.S. PATENT DOCUMENTS

| | | | | |
|---|---|---|---|---|
| 6,940,276 | B1 * | 9/2005 | Shafiyan-Rad et al. | 269/329 |
| 6,943,314 | B1 | 9/2005 | Kosted | |
| 6,976,814 | B1 * | 12/2005 | Newman | 409/225 |
| 2002/0083902 | A1 | 7/2002 | Evans | |

* cited by examiner

WORKPIECE CLAMPING DEVICE FOR AUTOMATED MACHINING PROCESSES

This application is a continuation of U.S. patent application Ser. No. 10/859,880, now U.S. Pat. No. 6,976,814, filed on Jun. 2, 2004, entitled "Workpiece Clamping Device for Automated Machining Processes", which claims priority to U.S. Provisional Patent Application Ser. No. 60/510,538, filed on Oct. 9, 2003, entitled "Workpiece Clamping Device for Automated Machining Processes". The disclosure of these related applications are incorporated herein by this reference.

BACKGROUND OF THE INVENTION

1. Technical Field

This invention generally relates to the field of engraving. More particularly, the invention relates to identification collars with embedded workpieces and a system for indexing, clamping and storing a workpiece in preparation for engraving which is usually accomplished by a computerized engraving machine.

2. Background Art

In engraving, it is very important that the workpiece that is being engraved is held securely in position. For modern engraving, which is often done by a machine run by computer generated codes, this positioning is even more important. The computer generated codes give the engraving machine instructions through a series of directions and coordinates. These directions and coordinates are in reference to a few specific datum points and a coordinate system that the machine recognizes and which is positioned on the machine itself. Therefore, the engraving machine begins to blindly engrave and the workpiece must be in the appropriate position and must be the appropriate size in order to be engraved properly. If the workpiece is out of position or the wrong size, then the engraving on the workpiece will be crooked or may even run off of the workpiece possibly damaging the workpiece holder or damaging the engraving machine itself. Another concern involved in engraving is that the workpiece must be firmly secured. If the workpiece is not firmly secured in place, then the piece can shift and can be damaged.

In the current state of the art, there are several different methods for properly placing and gripping the workpiece. One method involves clamps that clamp over the edges of the workpiece and grip it firmly to the workpiece clamping table. Standard clamping creates several problems. First, it is often hard to precisely place a workpiece in the clamps. Second, if the clamps are not placed in the appropriate areas, the engraving machine may run into the clamps. This may damage the machine, damage the clamps and could even injure people who are around the machine. Injury to people is a particularly serious problem when the engraving machine is placed in a mall or a pet store as they often are. Also, standard clamping requires a specific clamp set up depending on the shape of the workpiece. This is most often a manual process and can be quite time consuming.

Another method of securing the workpiece in place for engraving is to use a workpiece carrier. A workpiece carrier is a fixture that is specifically designed to hold the specific workpiece. For instance, if the machine is engraving a heart shaped dog tag, then the workpiece carrier would have a setup for holding only a heart shaped dog tag. The workpiece carrier would not hold any other shape of tag. The workpiece carrier is then attached to the workpiece clamping table and the machine can engrave the workpiece. This presents the first problem with using workpiece carriers. In order for a machine that uses workpiece carriers to engrave different types and shapes of workpieces, the machine must have several different workpiece carriers. These carriers must be interchanged either manually, or automatically by the machine. The use of workpiece carriers also limits the number of different types of workpieces that can be engraved by a machine. The machine can only engrave the workpieces for which it has a carrier. This also raises the expense of the machine, because the individual workpiece carriers must each be counted into the cost.

In the current state of the art, there are many different ways to attach a tag to a pet collar. The most common way involves collars that have a band that runs through a metal ring or have a metal ring suspended from the band. The tag is then attached to this ring, usually by means of an S-hook or spring-clip. This configuration also has disadvantages in that the identification tags tend to hang on the underside of the animal's neck, thereby making them difficult to access for reading. Another disadvantage of this configuration is that since the tags are hanging loose from the collar, and since the tags and hardware for attaching them to the collar are most often made of metal, they typically cause a jingling noise when the animal moves. The noise caused by the animal's movement can be annoying or even detrimental, as in the case of dogs used for hunting in situations where stealth is desired. In addition, when the tags are in a hanging position, they can be pulled loose when they become caught in foliage or the wires of kennel cages and fences. Even worse, if the tag is not pulled loose in such a situation, the result can be injury or death to the animal.

A commonly available alternative to the previously referenced configuration is a metal identification plate that is permanently affixed to the collar band by means of rivets, staples, and the like. Another technique makes use of a transparent window integral to the collar band which permits the insertion of an identification strip. These methods of attaching a tag to a collar all have the problem that the tag is not permanently attached and therefore it is possible to lose the tag. Several also have the problem that the tag must be engraved and then attached to the collar. This complicates matters, because the tag is usually engraved someplace accessible to the purchaser which means that the collar dealer must have the tools to attach the tag to the collar in addition to the tools to engrave the tag.

DISCLOSURE OF THE INVENTION

The present invention relates to engraving machines in general. Specifically, this invention relates to identification collars with embedded workpieces and a system for securing and identifying workpieces in engraving machines. The invention, however, is not limited to this field, but may be used in many different areas of identification and of machining or in which positioning, identifying and securing of an item is desired. Various novel aspects of the invention disclosed herein may be used in conjunction, or separately and those of ordinary skill in the art will readily understand how to apply the many novel aspects of the invention to other machining applications from the disclosure provided.

Embodiments of the invention include a nonmetallic pet collar with an embedded workpiece or pet tag for engraving. The pet collar or identification collar may be formed from multiple pieces of nonmetallic material. The pet tag or workpiece is attached to one piece of the nonmetallic material. Another piece of the nonmetallic material is cut so that it has an opening like a window in it. This second piece of nonmetallic material is positioned so that the window is over the pet tag and the second piece of nonmetallic material is attached to the first piece, directly in line with the first piece. The edges of the nonmetallic material are then sewn sealing the pet tag into the collar permanently. This prevents loss of the tag and eliminate the noise caused by tags jingling together. The design of the following system enables engraving on the pet tag embedded in the collar as well as many other shapes and sizes of workpieces.

Embodiments of the invention include a method of securing multiple sizes and shapes of workpieces in an engraving machine without the need for multiple workpiece carriers or clamping and positioning by hand. A workpiece is placed on a support surface of a workpiece clamping table of an engraving machine. A workpiece clamping table contains multiple workpiece alignment devices. Workpiece alignment devices are arranged so that they will align one or more points on a workpiece. When a workpiece is placed on a workpiece clamping table, one or more points on the workpiece are aligned with workpiece alignment devices. Workpiece alignment devices help to properly align a workpiece with respect to the machine's datum points or coordinate system.

Once a workpiece has been placed with respect to workpiece alignment devices on a support surface of a workpiece clamping table, at least one clamp is moved into position securing the workpiece against the workpiece alignment devices. Multiple clamps may be used. Clamps may even be used as workpiece alignment devices. Movement of the clamps may be manual, or movement of a clamp may be automated by placing the clamp on a chain or a belt drive.

A positional sensor may also be attached to the clamp. The positional sensor senses a positional characteristic of the clamp in relation to the workpiece alignment device. This positional characteristic which is often the distance that the clamp traveled in order to secure the workpiece against the workpiece alignment devices, is transferred to a processor that uses the positional characteristic in order to determine what type of workpiece has been secured to the workpiece clamping table for engraving. This is beneficial because it allows the machine to alter the message that it is engraving in order to fit the message on the workpiece. It also makes it possible for an inventory to be automatically kept of the available workpieces. It is even possible for the machine to automatically keep track of which workpieces need to be ordered.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 9A:
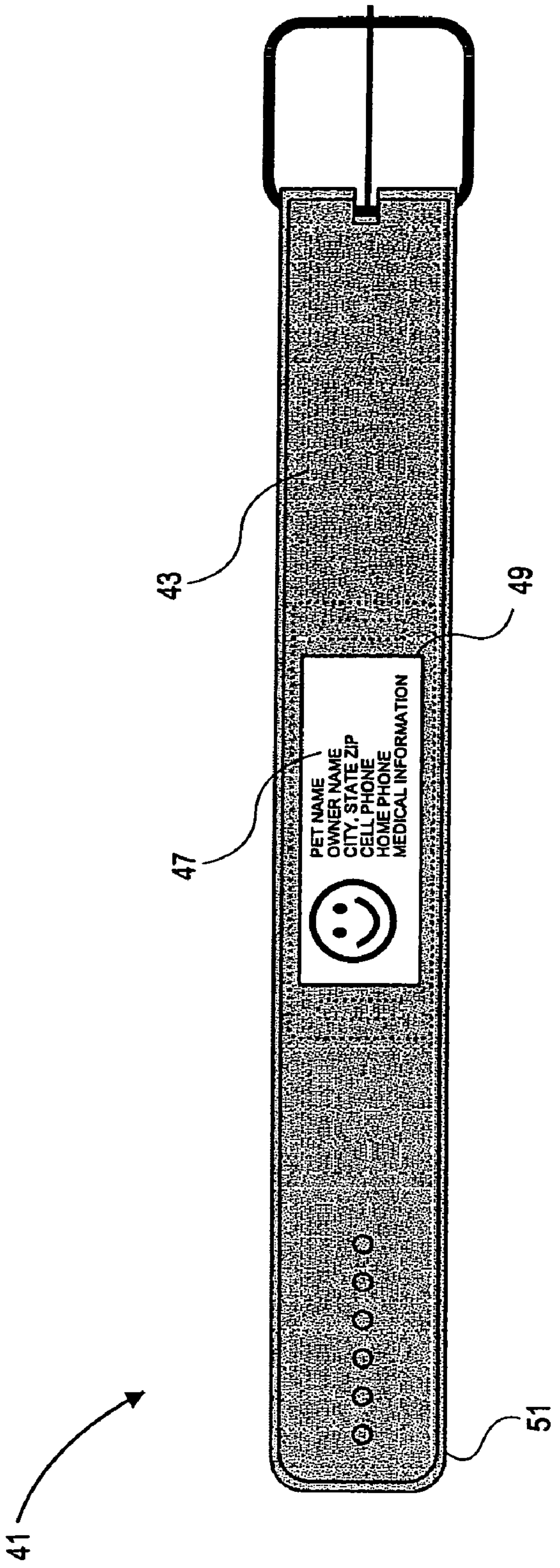
FIG. 9*a* is a top view of an identification tag with an embedded engravable tag.
Figure 9B:
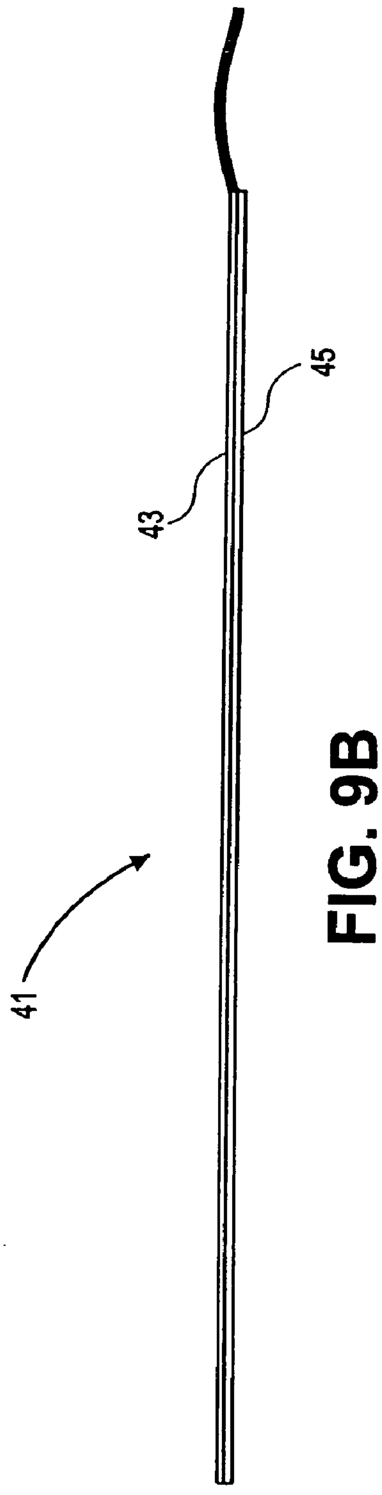
FIG. 9*b* is a side view of the identification tag of FIG. 9*a*.

FIGS. 9*a* and 9*b* illustrate an identification collar 41 configured according to an embodiment of the present invention. The disclosed invention is useful in many different areas requiring identification tags, such as medical identification bracelets, hospital identification tags and pet identification tags. The collar 41 itself is formed from multiple pieces (i.e. 43 and 45) of flexible material. The engravable tag or workpiece 47 is a pliable or malleable piece of engravable material which is sandwiched between the pieces of flexible material. One embodiment of the present invention uses two pieces of flexible material 43 and 45. The first piece of flexible material 45 is the underside of the identification collar. The engravable tag or workpiece 47 is affixed to the first piece of flexible material 45 using an adhesive. The second piece of flexible material 43 is the outside of the identification collar. This piece of flexible material has an opening 49 cut into it. This opening 49 may be a square, oval or other shape that provides a window for the engravable tag 47 to be viewable through. The second piece of flexible material 43 is attached to the first piece of flexible material 45, in such a way that the opening is over the engravable tag or workpiece 47 so that it is viewable from the outside of the identification collar 41. The first and second pieces 43 and 45 of flexible material are aligned so that they are directly in line with each other and on top of each other. The edges of the collar 51 are then sewn together so that the engravable tag 47 is held firmly in place. Additional stitching may be placed on the collar 41 adjacent the engravable tag 47 to further ensure the tag 47 is held firmly in place. A connector is then attached to both ends of the pieces of flexible material (43, 45). This connector may be a buckle or other means of connecting the collar 41.

In another embodiment of the identification collar 41, three pieces of flexible material are used, though the pieces are not all the same size. In this embodiment, the top piece 43 is formed of two pieces, each smaller than the third, underside piece 45. All of the pieces of flexible material are the same length. The first piece of flexible material is the largest of the three. This piece 45 is the inside of the identification collar 41. The engravable tag or workpiece 47 is affixed to the first piece of the flexible material 45 with an adhesive. Half of a window 49 is cut out of the edge of each of the smaller pieces of flexible material forming piece 43.

These pieces of flexible material 43 and 45 will form the outside of the identification collar 41. One of the smaller pieces of flexible material will be placed on the pet tag or workpiece 47 forming the first half of the top piece 43. The edge of the piece of flexible material should align with the edge of the first piece of flexible material 45. The half window that was cut out of the edge of the smaller piece of flexible material should align so that it frames the engravable tag or workpiece 47. The other small piece of flexible material will also be placed on the engravable tag or workpiece 47 forming the second half of the top piece 43. The edge of the piece of flexible material should align with the edge of the first piece of flexible material 45. The half window that was cut out of the edge of the smaller piece of flexible material should also align so that it frames the engravable tag or workpiece 47. The pieces of flexible material are then sewn together so that the engravable tag or workpiece 47 is securely held in the identification collar 41. Additional sewing may be added, such as around the workpiece 47 or along the seam between the two halves of the top piece 43 to ensure the workpiece 47 is securely held in place. A connector is then attached to both ends of the pieces of flexible material (43, 45). This connector may be a buckle, velcro or other means of connecting the collar 41.

Another embodiment, would use flexible material that is created in a tube. A window is then cut through at least one of the sides of the tube. The workpiece 47 is glued into the window and the tube is flattened in order to form a collar 41. The tube of flexible material may be glued flat, sewn flat or in some other way formed into a flat collar. A connector is then attached to both ends of the pieces of flexible material (43, 45). This connector may be a buckle or other means of connecting the collar 41. This embodiment illustrates that it does not matter how the two or more pieces of flexible material are attached to each other. In this case, they were created attached.

Additionally, a window may be cut in both the front and the back of the collar 41. This allows the workpiece 47 to be seen on the inside and outside of the collar 41. This is useful for additional information to be printed on the inside of the workpiece 47. For instance, a pet owner could put the pet's name, address and other relevant information on the front of the workpiece 47 while putting the pet's vaccination information on the inside of the workpiece 47.

Additional assembly after the engravable tag or workpiece 47 has been engraved is not required. Furthermore rivets, which add weight to the collar and allow the tag to be ripped off or get caught on things, are not needed. Using conventional engraving methods, engravers of engravable tags have been unable to engrave on a tag embedded in a collar. Consequently, collars with permanently embedded engravable tags are not available as an option for pet owners. It is believed that the invention of this identification collar coupled with the techniques and apparatus for engraving the collar which follows is unique in the industry.

Figure 1:
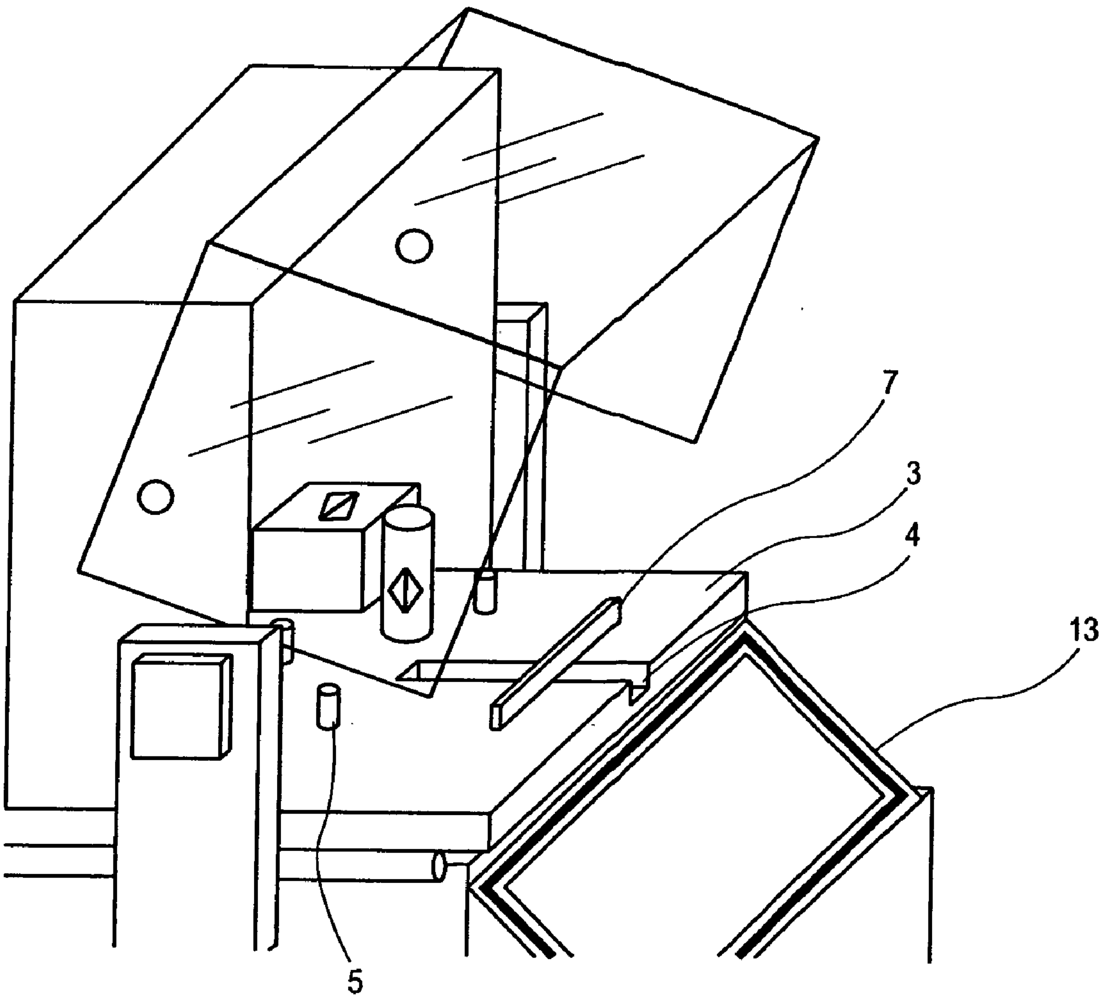
FIG. 1 is a side view of a workpiece clamping table according to an embodiment of the present invention.
Figure 2:
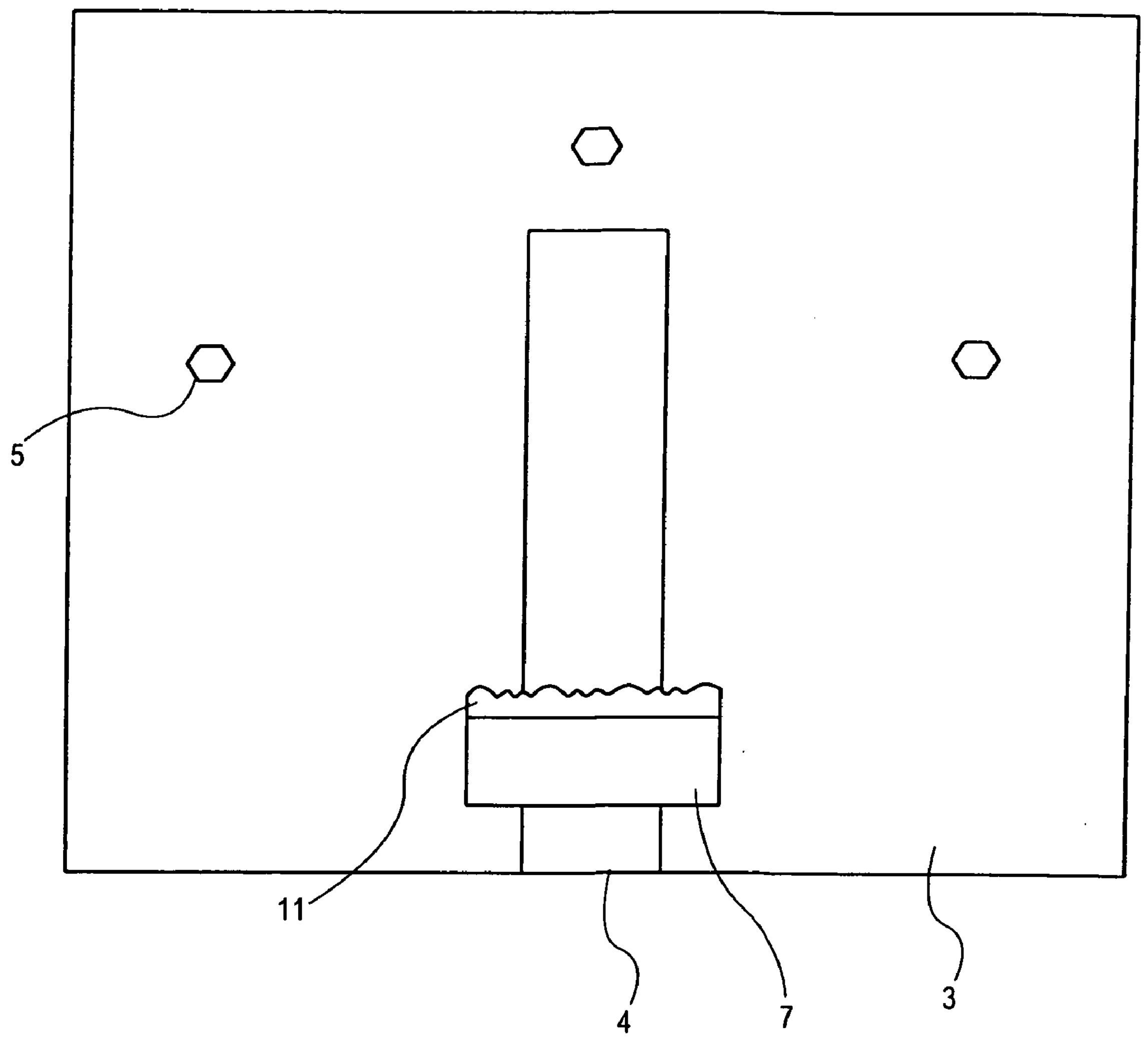
FIG. 2 is a top view of a workpiece clamping table configured according to an embodiment of the present invention.

FIG. 1 illustrates an embodiment of the present invention. The present invention is useful in many different types of machining processes, i.e. most computer controlled machining processes, and provides a way for workpieces to be clamped, aligned and identified for machining. The invention will, however, be discussed with particulars referring to the area of pet tag engraving. This invention consists of at least one supporting surface 3 as shown in FIG. 2. The supporting surface 3 supports the workpiece for machining. This supporting surface 3 may be like a table top or a platform on which a workpiece is held to be machined. One embodiment of the supporting surface 3 is a horizontal flat table-like surface on which the workpiece is placed for machining.

Another embodiment of a supporting surface 3 is a vertical wall-like surface. The workpiece can be attached to the supporting surface 3 by some sort of adhesive or it could also hang on some sort of protrusion from the supporting surface 3. The workpiece could fit into a groove on the supporting surface 3 or sit on a ledge on the supporting surface 3. This embodiment would allow for machining where the engraving tool moves in a vertical plane or even a controlled three-dimensional plane.

Yet another embodiment of the invention contemplates a supporting surface 3 at some angle to the horizontal. This angle could be as small or as big as is necessary for a particular application and may be motivated by, for example, a desire to display the workpiece for more easy viewing during engraving. The workpiece would be held to the supporting surface 3 by hanging from a protrusion or fitting in a groove or recess. Other options for attaching the workpiece to the supporting surface 3 may include attaching the workpiece to the supporting surface 3 an adhesive or sitting the workpiece on a ledge on the supporting surface 3. Another option is to provide the supporting surface 3 with a rough, or high friction coefficient, rubber surface that would create enough friction with the workpiece to hold it in place. This embodiment would allow for machining with machines that do not have a flat coordinate plane. The supporting surface 3 may be horizontal or placed at an angle depending on the type of machining operation to be performed or the type of machine being used.

Multiple supporting surfaces 3 are also contemplated. For example, the supporting surface 3 may be made expandable (like a dining table) with a leaf or piece that fits into the gap in order to make the surface larger. Multiple supporting surfaces 3 may also be used if the workpiece has multiple faces that need to be supported. An example of this embodiment is a 3-dimensional hexagonal workpiece. If more than one of the faces is to be engraved, then either the workpiece must be rotated with respect to a single supporting surface 3, the workpiece must be secured to the supporting surface 3 in a way that prevents movement, or there needs to be multiple supporting surfaces 3 to support multiple faces in order to prevent movement during the engraving process. The multiple surfaces can even be hinged or otherwise configured to adjust. This makes it possible to have the supporting surfaces 3 at a different angle to each other depending on the workpiece that is being machined. Support surfaces 3 may be manufactured from wood, fiberglass, metal, plastics or any other suitable material or combination of materials. The material must simply have the qualities necessary to provide support to the workpiece during the machining process.

Figure 3:
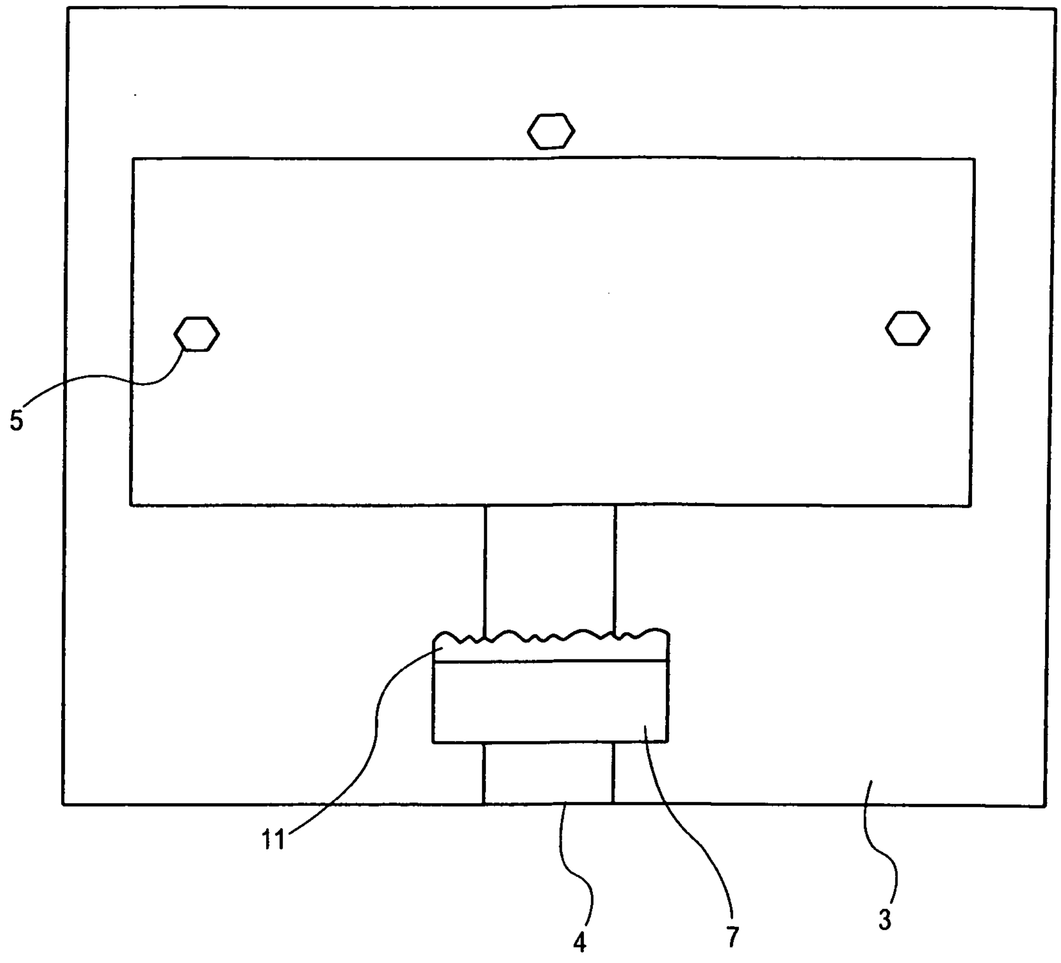
FIG. 3 is a top view of a workpiece clamping table with a rectangular workpiece in place on workpiece alignment devices configured according to an embodiment of the present invention.

As best illustrated in FIG. 3, workpiece alignment devices 5 are connected to the supporting surface 3. Workpiece alignment devices 5 are used to align the workpiece on the supporting surface 3. The workpiece is aligned with respect to datum points on the machine. These datum points are inherent in the engraving machine. Each automated engraving machine has an origin and coordinate system, or datum points that it recognizes. It is very important that the workpiece be placed appropriately on the support surface 3 because the automated machine will engrave at the coordinates it is given regardless of where the workpiece is. The coordinate system is on the machine itself and is not changed by the clamping table. The workpiece alignment devices 5 may be indexing pins as in the embodiment illustrated. Pins extend from the supporting surface 3 through openings in the workpiece in order to properly align the workpiece with the machine. Alignment is important, because computer machining is based on coordinates measured from specific datum points on the machine. If the workpiece is not correctly aligned, then the machining process will not work properly. Indexing pins 5 may have cross sections of any shape, for example, round, square, oval, triangular. Specifically shaped openings may be made in the workpieces to match specifically shaped pins in order to keep the workpiece properly aligned and reduce the risk that a particular workpiece is skewed from its proper alignment. For instance, one pin may have a square cross section and another may have a triangular cross section. To align with those pins 5, the workpiece would have a square opening and a triangular opening. In this way, the workpiece would only fit on the pins 5 at a certain alignment.

The workpiece alignment devices 5 may be small indentations or raised areas on the supporting surface 3. In another particular embodiment of the workpiece alignment devices 5, a pin on the workpiece aligns with an opening in the supporting surface 3. The pin or pins attached to the workpiece may also have different cross sections in order to more specifically align the workpiece with the machine.

In yet, another embodiment of the workpiece alignment devices 5, the workpiece alignment devices 5 include two or more movable pieces that are parallel to the sides of the workpiece. These movable pieces may consist of metal, rubber, or plastic bumpers or clamps that move until they abut the sides of the workpiece, aligning the workpiece with the datum points of the machine. The alignment of the workpiece depends upon the rates of the movement of the different bumpers/clamps. If the bumpers/clamps are all moving at the same rate and they all move the same distance, then the workpiece may be aligned in the center of the support surface 3 or at least in the center of the bumpers/clamps. By varying the speeds of the bumpers/clamps and the distance that the bumpers/clamps are moved, it may be possible to adjust the alignment of the workpiece. It is also possible to automatically adjust the alignment of the workpiece using a computer controller.

Another possible embodiment of the workpiece alignment devices 5 includes multiple bumpers/clamps like those described above that may be biased by springs or some other means of applying force. The workpiece is placed between the multiple bumpers/clamps which apply consistent force to center the workpiece with respect to the bumpers/clamps.

The workpiece alignment devices 5 need not be attached to the supporting surface 3. The workpiece alignment devices 5 could be attached to the machine itself or may be attached in anyway that aligns the workpiece with the datum points on the machine. The workpiece alignment devices 5 may be permanently attached to the supporting surface 3 or they may even be removable. The workpiece alignment devices 5 may be immovable or may move with respect to the workpiece.

Figure 4:
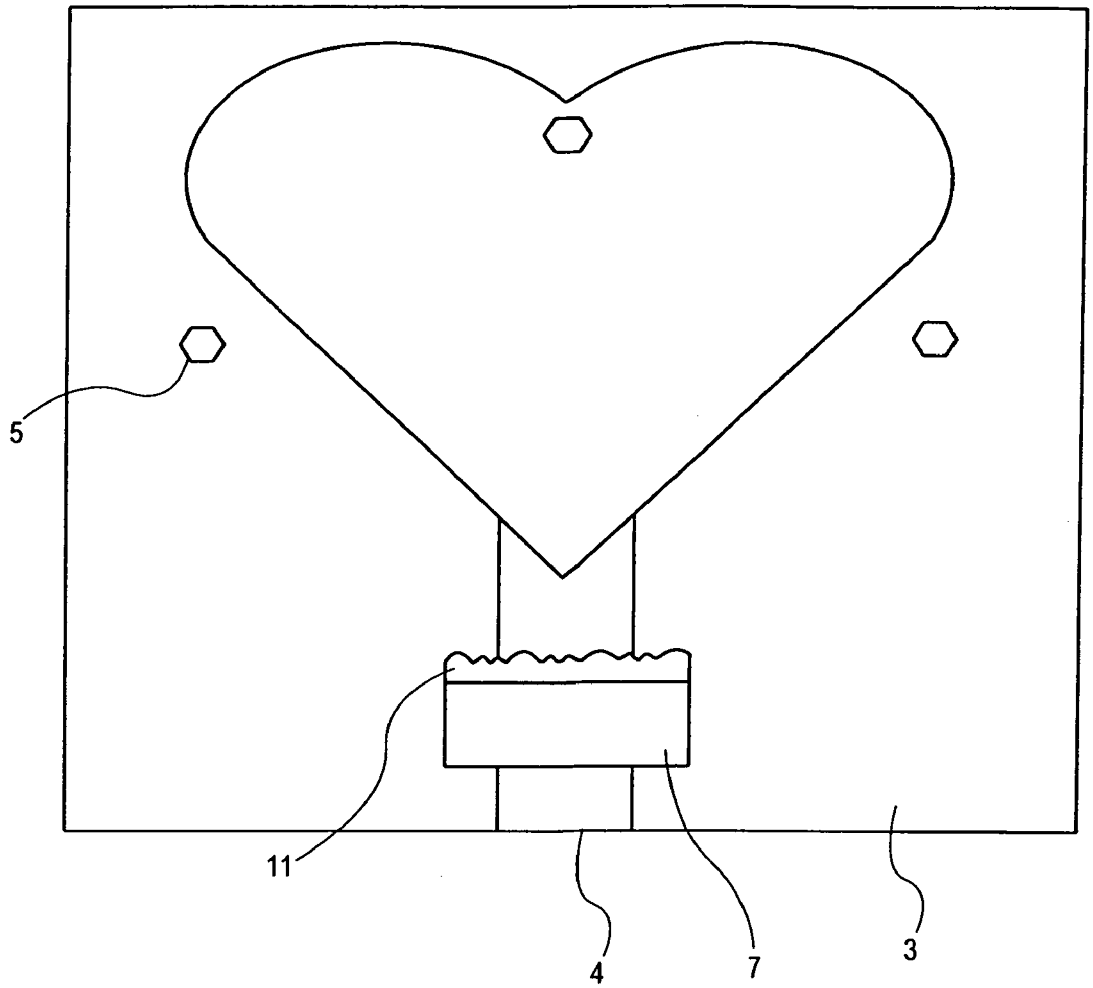
FIG. 4 is a top view of a workpiece clamping table with a heart-shaped workpiece in place on workpiece alignment devices configured according to an embodiment of the present invention.
Figure 5:
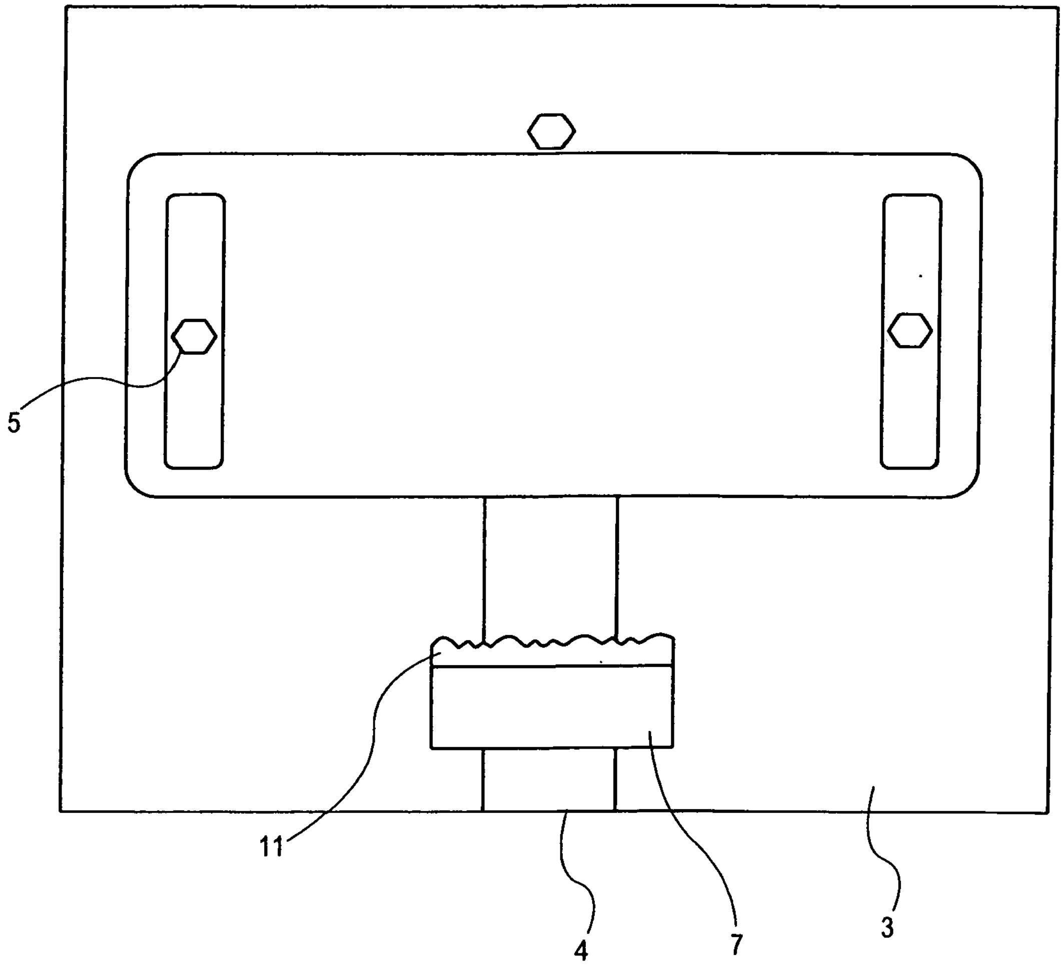
FIG. 5 is a top view of a workpiece clamping table with an elongated workpiece in place on workpiece alignment devices configured according to an embodiment of the present invention.
Figure 6:
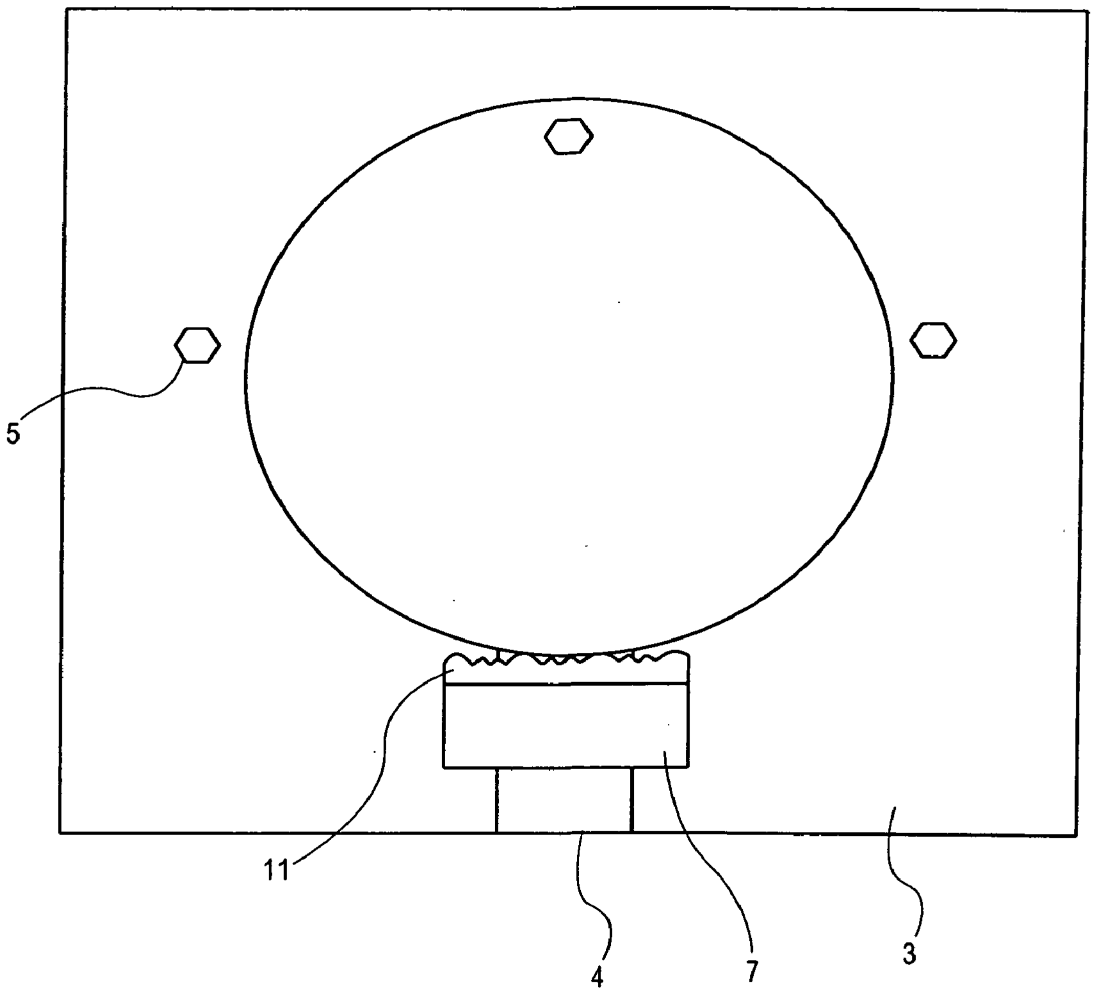
FIG. 6 is a top view of a workpiece clamping table with a circular workpiece in place on workpiece alignment devices configured according to an embodiment of the present invention.

As shown in FIG. 4, embodiments of the invention may also contain at least one clamp 7. The clamp 7 attaches the workpiece to the support surface 3 or machine and may aid in aligning the workpiece. In one embodiment, the clamp 7 may slide along the support surface 3 until the clamp 7 abuts the workpiece, forcing it firmly against at least one workpiece alignment device 5. The clamp 7 may manually be slid along a groove 4 in the support surface 3 until the clamp 7 abuts the workpiece or movement of the clamp 7 may be automated by way of a chain or belt drive. The clamp 7 may be attached to the support surface 3 or to a portion of the machine itself.

In another embodiment of the invention there may be two clamps 7, which abut the sides of the workpiece, forcing it into alignment along one axis while the workpiece alignment devices 5 align the workpiece along the other axis. Three clamps 7 may also be used. One clamp 7 may force the workpiece against the workpiece alignment devices 5, while the other two clamps 7 abut against opposite sides of the workpiece, forcing the workpiece into alignment along another axis.

A clamp 7 may act as a workpiece alignment device 5 and as a clamp 7. In this embodiment, four clamps 7 could be used. Each of them abutting a side of the workpiece. If each of these clamps 7 moves at the same rate, the workpiece will be forced into the center of the support surface 3, aligning the workpiece with the machine. In this way, the clamps 7 act as clamps 7 and also as alignment devices 5. Embodiments with multiple clamps 7 (some with more than four or with odd numbers of clamps 7) are also possible. In these embodiments the clamps 7 act both as clamps 7 and as workpiece alignment devices 5, clamping the workpiece to the supporting surface 3 and forcing the workpiece into the appropriate position to be machined.

The clamps 7 may have different shapes and be made of many different materials. In one embodiment the clamps 7 may be shaped as bars with flat surfaces. The clamps 7 may be two posts that extend vertically. The clamps 7 may also be shaped as a hollow half circle with the convex or concave surface abutting the workpiece. The surface of the clamps 7 may be smooth or may have a saw-tooth edge 11 in order to grip the workpieces better. This saw-tooth edge 11 may also allow the clamp 7 to grip workpieces with edges that are not flat. As shown in FIGS. 2 through 7, another embodiment of the clamp 7 includes a saw-tooth edge 11 with rounded spots for gripping circular or elongated workpieces. The clamps 7 may be made of metal, metal with a rubber bumper, all rubber or even plastic or other materials.

Particular embodiments of the invention also include a positional sensor. A positional sensor is anything that senses a positional characteristic of the clamp 7 in relation to the workpiece alignment device 5 or other datum point associated with the machine. A positional sensor may be a single entity or may be a system with different devices working together for the final outcome. The positional sensor may be placed in or on the clamp 7, or it may be in or adjacent to the support surface 3. The positional sensor may sense several different positional characteristics of the clamp 7 in relation to the workpiece alignment device 5. The positional sensor may determine the distance that the clamp 7 has moved in order to abut the workpiece securely against the workpiece alignment devices 5. The positional sensor may also determine the distance between the clamp 7 after it has moved into position against the workpiece and the workpiece alignment devices 5. An alternate embodiment of the positional sensor involves a camera that takes measurements of the workpiece or takes pictures of the workpiece.

Figure 8:
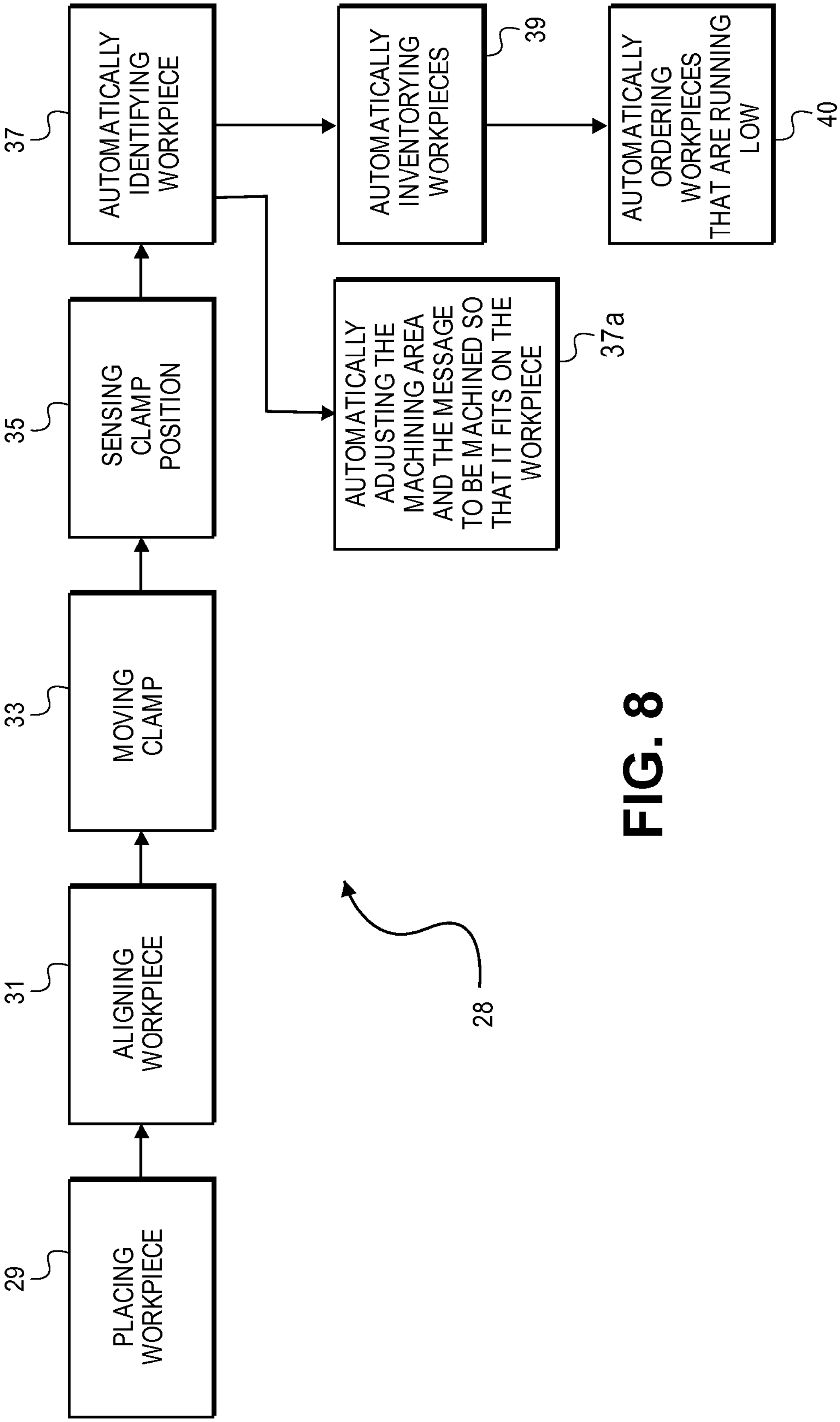
FIG. 8 is a flowchart of a method of clamping a workpiece to a workpiece clamping table.

The information obtained by the positional sensor is then transferred to a processor 13 (illustrated in FIG. 1). The processor 13 may be the processor found in a conventional personal computer with appropriately configured software. The processor 13 is configured to receive an indication of the positional characteristic and determine a workpiece type in response to the positional characteristic. This identification of the workpiece type is done through either an estimation performed by an algorithm or by comparing the measurement to a database that has information stored relevant to all known workpieces. Once the processor 13 has determined the dimensions, and/or characteristics of the workpiece to be machined, the machine automatically adjusts its machining area and the message to be machined so that it fits on the workpiece (Step 37*a*as shown in FIG. 8).

Along with determining the type of workpiece being machined, it is possible that the processor 13 could be configured so that it also automatically inventories the workpieces to determine how many are available. The processor 13 can be programmed to keep track of the inventory of workpieces available at the machining site. This processor 13 configuration may consist of a database containing the number and types of workpieces that are available at the machining site. As workpieces are machined, the processor 13 receives data from the positional sensor which allows the processor 13 to determine what type of workpiece is in position to be engraved. The processor 13 keeps track of the number and types of workpieces that are still available for machining. It is also possible that the processor 13 may store this inventory remotely, so that the processor 13 sends the information to the parts supplier. One possible embodiment for the processor 13 configured to automatically inventory the workpieces available for use includes a computer program that has a list of all of the workpieces with which the machine was stocked. As parts are machined, the processor 13 determines what type of workpiece is being machined. The information concerning the type of the machined workpiece is then transferred automatically to the inventory, and the processor 13 keeps a running tally of which parts are in stock. This can all be done through multiple or even a single computer program which would keep track of what workpieces had been used and which workpieces are left to be machined.

The processor 13 may also be configured to automatically order workpieces when they are running low. The processor 13 automatically takes the inventory requirements and uses these requirements to request more workpieces from the entity that provides the workpieces for the machine. One embodiment of this processor 13 configuration is simply a computer program that has access to the internet. The computer program receives data from the processor 13 on which workpieces are almost gone. The program then sends an email, other message, or an order to the workpiece provider. The processor 13 could also be programmed to keep track of the rate at which the workpieces were being used up to anticipate how many and when the parts needed to be ordered. This automatic ordering process may be part of a computer program that inventories or it may be its own program.

Figure 10:
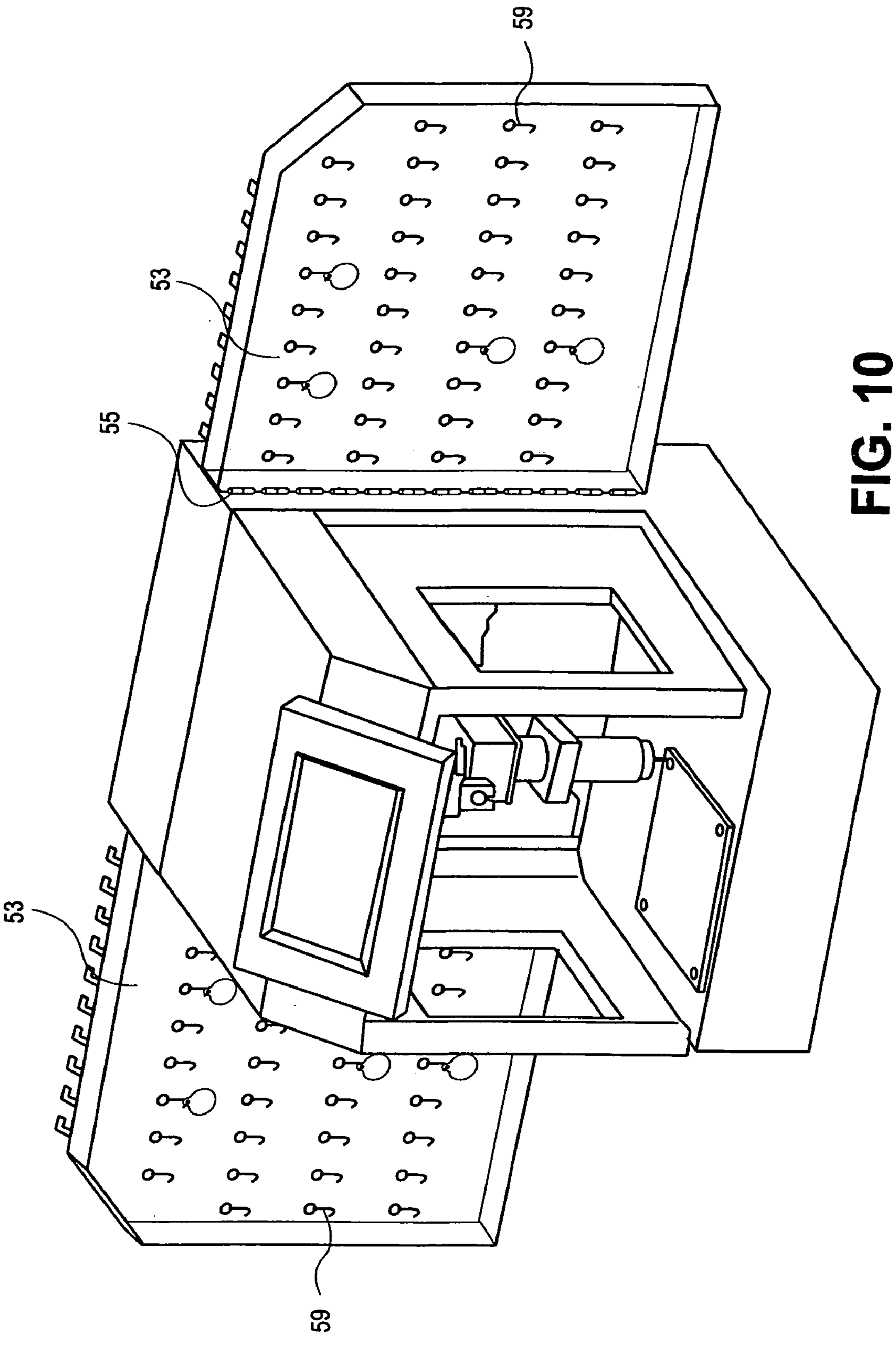
FIG. 10 is a side view of an engraving machine with workpiece inventory doors configured according to an embodiment of the present invention.

FIG. 10 illustrates that while not in use, the workpieces may be stored in workpiece inventory doors 53. These workpiece inventory doors 53 are a feature that may be added to the workpiece engraving machine 57. The doors 53 are rectangular chambers with hooks 59 that hold the workpieces. The workpieces are attached to these hooks 59 and are displayed so that a customer can view the workpieces. These workpiece inventory doors 53 may be hinged 55 to the engraving machine 57. This hinge 55 makes it so that the doors 53 can be closed against the machine 57 or open to show the workpieces. This makes it possible for the machine 57 to be packed up and moved without being required to pack the workpieces in a separate container. The workpiece inventory doors 53 are also removable, being mounted on detachable hinges 55. By simply pulling up on the workpiece inventory doors 53, they can be removed from the engraving machine 57. This allows the workpiece inventory doors 53 to be used as a stand alone display for the workpieces. The doors 53 can then be leaned against something in order to create a display where the workpieces can be viewed. The doors 53 may even be set up as a freestanding display case. It is possible to attach the workpiece inventory doors 53 to wheels or a lazy susan in order to make it possible for the doors 53 to be rotated when they are being used to display the workpieces. The workpiece inventory doors 53 may also be arranged so that they lean against each other and with their tops meeting at an angle and coupled together in order to serve as a display case with one set of workpieces on one side and another set of workpieces on the other side. This multi-sided display may also be placed on a lazy susan in order to create a multi-sided rotational display case similar to that commonly found in jewelry stores. The workpiece inventory doors 53 may be formed from metal, plastic or any other material that is sturdy enough to support the weight of the workpieces on display. The workpiece inventory doors 53 may be formed in one piece or in multiple pieces and attached together.

Figure 7:
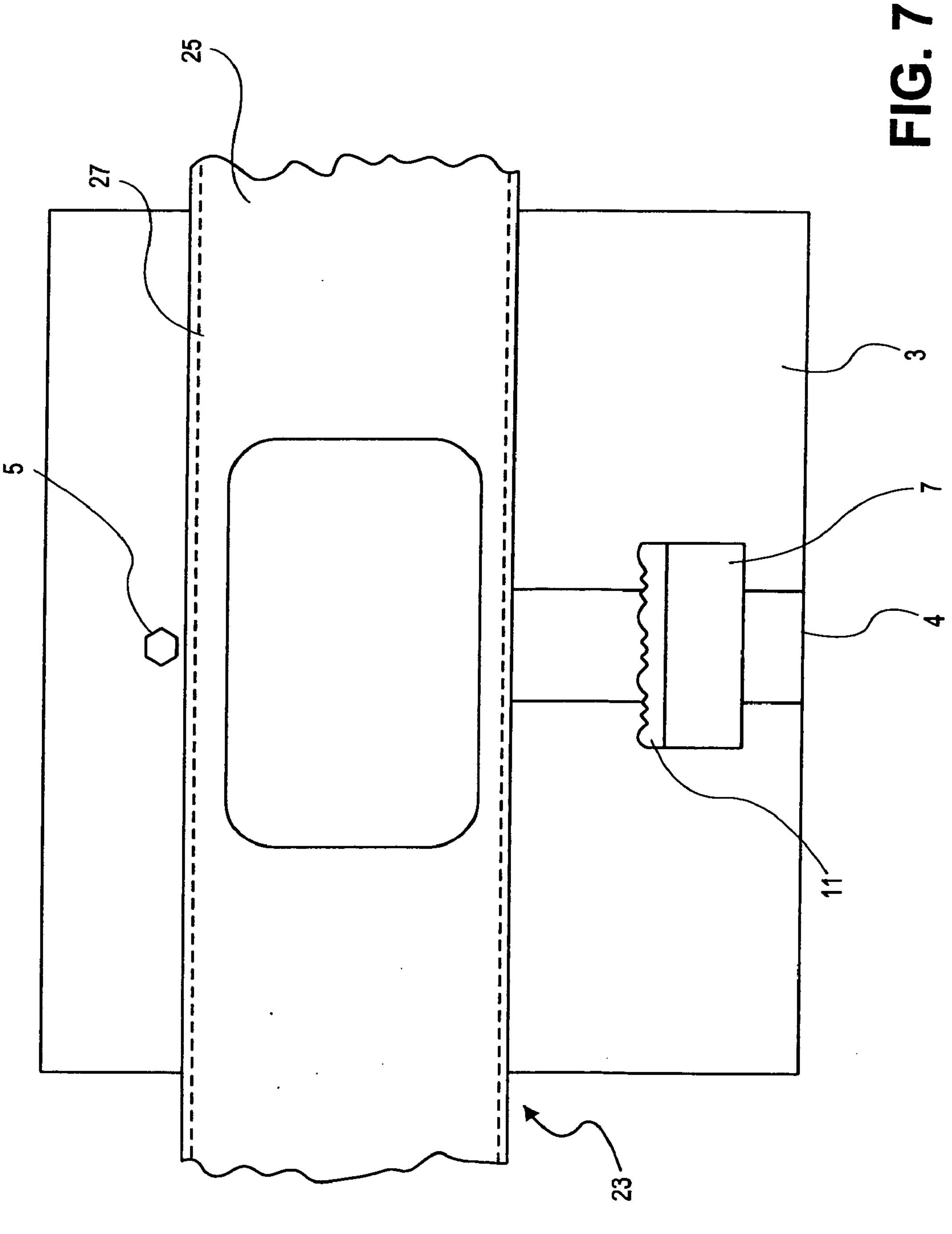
FIG. 7 is a top view of a workpiece clamping table with an elongated metal pet tag embedded in a nonmetallic pet collar in place on workpiece alignment devices configured according to an embodiment of the present invention.

This system may allow a variety of workpieces to be machined that have traditionally been difficult or impossible to machine in an automatic engraver. For example, it may be possible to automatically engrave on pet tags 27 that are embedded into a nonmetallic collar 25, 23 (as shown in FIG. 7). This can be accomplished by placing the collar 23 so that it is abutting one or more indexing pins and then clamping the collar 23 into place. The positional sensor calculates how far the clamp 7 moved and this information is transferred to the processor 13 which identifies the workpiece and adjusts the engraver settings so that the engraver will engrave the pet tag 27 and not the flexible collar material 25.

FIG. 8 illustrates a method 28 by which the system operates. The first step, Step 29, involves the workpiece being placed on the support surface 3 in the approximate position required for machining (or at least in the position required for the system to secure the workpiece.) This may mean that the workpiece needs to be placed in the approximate center of the supporting surface 3. It may also mean that the workpiece needs to be placed in a specific position with respect to the workpiece alignment devices 5.

Next, step 31, the workpiece is aligned with the workpiece alignment device 5. Often, steps 29 and 31 occur at the same time. Step 31 may require that an opening in the workpiece be placed around a workpiece alignment device 5 such as an indexing pin. Another embodiment involves a pin being attached to the workpiece. The workpiece is placed so that the pin on the workpiece fits into an opening on the supporting surface 3. Yet another embodiment involves a workpiece being placed on a ledge on the supporting surface 3. These different embodiments of step 31 allow multiple sizes and shapes of workpieces to be aligned by the same workpiece alignment devices 5.

Step 33 involves manually, or automatically moving a clamp 7 into a position abutting the workpiece. One embodiment of step 33, involves moving one clamp 7 so that the clamp 7 forces the workpiece firmly against a set of indexing pins which are used as workpiece alignment devices 5. In step 31, the workpiece is placed so that openings in the workpiece surround the indexing pins. Step 33 forces the workpiece into position firmly against these workpiece alignment devices 5 and firmly into alignment. Another embodiment of step 33, involves moving multiple clamps 7 at once, forcing the workpiece into position on the support surface 3 and clamping the workpiece in place. In this embodiment, the clamps 7 act as both the workpiece alignment devices 5 and as the clamps 7.

The fourth step, step 35, involves sensing an indication of a positional characteristic of the clamp 7. One embodiment of step 35 has a positional sensor, which determines the distance that the clamp 7 moved in order to abut the workpiece firmly against the workpiece alignment devices 5. Another embodiment of step 35 involves a positional sensor sensing the distance between the workpiece alignment devices 5 and the clamp 7. Yet another embodiment of step 35 involves the positional sensor acting as a camera that measures dimensions of the workpiece.

The fifth step, step 37, in the method embodied in FIG. 8 involves the processor 13 automatically determining what type of workpiece has been placed on the table to be machined. In one embodiment of step 37, the processor 13 takes the information gathered by the positional sensor from sensing the clamp position 35. The processor 13 then determines the type of workpiece that is about to be machined, or at the very least it determines the area on which the machine should machine. One embodiment of the processor 13 is a computer. In this embodiment, the positional characteristics gathered by the positional sensor are transferred through wires, or by some other means to the computer. The computer takes the positional characteristics and compares these characteristics to a list of data stored in a database. When the computer finds a match, it returns the type of workpiece that is on the support surface 3 ready to be machined. For instance, the computer could be given the measurement of how far a clamp 7 has moved in order to abut the edge of the workpiece and hold it firmly against the workpiece alignment devices 5. The computer that is determining what type of workpiece is being machined may contain a database that has a list of all of the known workpieces and the distance that the clamp 7 moves in order to abut the edge of the workpiece and hold it firmly against the workpiece alignment devices 5. The computer runs a comparison of the characteristic with the measurements that are stored in the database. When the computer finds a measurement that matches the characteristic, the computer returns an indication of the type of workpiece that is secured to the support surface 3 for machining. In another embodiment of step 37, the positional characteristics are taken by a camera that measures the lengths of the different sides of the workpiece. These characteristics are transferred to the processor 13. The processor 13 includes an algorithm that uses these lengths to determine the area on which it can engrave. The processor 13 determines this area and the machine alters the message it is engraving to fit it on the workpiece.

Other steps may be added to the method above. For instance, the workpiece type determined by the processor 13 is also useful for automatically inventorying workpieces (Step 39) available for machining. Once the processor 13 determines what workpiece is being machined, the information may be fed to an inventory program associated with the processor 13, which keeps track of the quantity and type of workpieces that are in stock. Step 39 utilizes a computer database that keeps a running total of which workpieces were ordered and which have been used. In this way, it is possible to always know how many workpieces are available for use.

In yet another step, it may even be possible to configure the processor 13 to automatically order additional workpieces (Step 40). The processor 13 takes the information from the inventory (Step 39) and passes the information pertaining to how much inventory is available to a program in the processor that automatically orders the needed workpieces. This automatic ordering program uses the information from the inventory in order to determine which workpieces need to be reordered. The processor 13 may even be configured to determine which workpieces are used the fastest and to order in anticipation of this fact.

Steps 37, 39 and the automatic ordering program may be embodied as a single computer program that performs these functions in this order or in other possible orders.

As shown in FIG. 7, these methods also make it possible to secure a workpiece that is affixed to a non-metallic material such as a metallic dog tag 27 embedded in a non-metallic dog collar 25. The collar 23 itself can be placed in position on the supporting surface 3 and then aligned with the workpiece alignment devices 5. This can be done by several different methods. One embodiment for aligning a non-metallic dog collar 23 may involve placing the dog collar 23 so that it is directly abutting the indexing pins which would align the dog collar 23 properly with the machine. A clamp 7 then presses forward abutting the collar 23 and holding it in place so that the embedded metallic dog tag 27 is secured for engraving. The type of workpiece in place for machining could then be determined by a method of determining the type of workpiece secured FIG. 7. Another embodiment for aligning the non-metallic dog tag 23 would be to place the dog tag 23 in the center of the supporting surface 3. Multiple clamps 7 then move forward, aligning and securing the collar with respect to the machine datum points. The type of workpiece in place for machining could then be determined by a method of determining the type of workpiece secured FIG. 7. The engraving machine is then be able to engrave the metallic dog tag 27 embedded in the non-metallic collar 25.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation. Similarly, any steps or sequence of steps of the method of the present invention indicated herein are given as examples of possible steps or sequence of steps and not as limitations, since numerous workpiece clamping methods and sequences of steps may be used to secure workpieces for engraving.

The invention claimed is:

1. A method of engraving a workpiece secured to a workpiece clamping table having at least one workpiece support surface, the method comprising:

placing a workpiece on the at least one support surface;

aligning the workpiece with an alignment device associated with the at least one support surface;

moving a clamp in relation to the at least one support surface until it abuts the workpiece;

sensing an indication of at least one positional characteristic of the clamp;

automatically identifying, based on the sensed at least one characteristic, a workpiece type for the workpiece on the at least one support surface;

and engraving the workpiece.

2. The method of claim 1, wherein aligning the workpiece comprises aligning a first workpiece of a first shape and a first size, removing the first workpiece, and aligning a second workpiece of a second shape and a second size.

3. The method of claim 1, further comprising automatically inventorying a supply of the workpieces to determine how many are available.

4. The method of claim 3, further comprising automatically ordering workpieces that are running low.

5. A workpiece clamping table for an engraving machine, the table comprising:

at least one support surface;

at least one clamp moveably associated with the at least one support surface;

at least one workpiece alignment device associated with the at least one support surface; and at least one sensor associated with the at least one support surface, wherein the at least one sensor is configured to sense at least one characteristic of a workpiece in contact with the at least one support surface, wherein the workpiece clamping table is configured to automatically determine the workpiece type in response to the at least one characteristic.

6. The workpiece clamping table of claim 5, wherein the at least one clamp comprises at least one post that extends perpendicular to the at least one support surface.

7. The workpiece clamping table of claim 5, wherein the at least one characteristic is the size of the workpiece.

8. The workpiece clamping table of claim 5, further comprising a processor coupled to the at least one sensor, the processor configured to receive the at least one characteristic of the workpiece and determine the workpiece type in response to the at least one characteristic.

9. The workpiece clamping table of claim 8, wherein the processor further automatically keeps an inventory of available workpieces.

10. The workpiece clamping table of claim 9, wherein the processor further automatically orders more workpieces if availability is becoming low.

11. The workpiece clamping table of claim 10, wherein the processor automatically keeps track of the rate at which the workpieces are used and anticipates when workpieces need to be ordered and how many need to be ordered.

12. The workpiece clamping table of claim 8, wherein the processor automatically adjusts the machining area of the engraving machine and the message to be machined so that it fits on the workpiece.

13. A workpiece clamping table for an engraving machine, the table comprising:

at least one support surface;

at least one clamp moveably associated with the at least one support surface;

at least one workpiece alignment device associated with the at least one support surface, wherein the at least one clamp in conjunction with the at least one workpiece alignment device aligns a workpiece placed in contact with the at least one support surface in the appropriate position for the engraving machine's built in coordinate system;

at least one sensor, wherein the at least one sensor is configured to sense a characteristic of a workpiece in contact with the at least one support surface, wherein the workpiece clamping table is configured to automatically determine the workpiece type in response to the at least one characteristic; and wherein the workpiece clamping table automatically transfers required information concerning the workpiece type to the engraving machine.

14. The workpiece clamping table of claim 13, wherein the at least one characteristic is the size of the workpiece.

15. The workpiece clamping table of claim 13, wherein the at least one characteristic is at least one dimension of the workpiece.

* * * * *